United States Patent [19]

Gagné

[11] 4,188,502
[45] Feb. 12, 1980

[54] SPACER-DAMPER

[75] Inventor: Jean-Guy Gagné, Montreal, Canada

[73] Assignee: Hydro-Quebec, Montreal, Canada

[21] Appl. No.: 970,734

[22] Filed: Dec. 18, 1978

[51] Int. Cl.$^2$ .......................... H02G 7/14; H02G 7/12
[52] U.S. Cl. ......................................... 174/42; 174/46
[58] Field of Search .................... 174/42, 128 BL, 146

[56] References Cited

U.S. PATENT DOCUMENTS

| 3,475,544 | 10/1969 | Reed | 174/42 |
| 3,748,370 | 7/1973 | Dalia | 174/42 |

FOREIGN PATENT DOCUMENTS 1098813  1/1968  United Kingdom .................... 174/146

OTHER PUBLICATIONS (S60560204F) "Spacer Damper for Overhead Transmission Lines," *Research Disclosure*, No. 142, Feb. 1976, pp. 12 and 13, published by Industrial Opportunities, Ltd., England.

Primary Examiner—Laramie E. Askin

[57] ABSTRACT

The invention concerns a spacer-damper of the type for separating bundled subconductors of a power transmission line and for damping vibrations generated in those subconductors. The spacer-damper comprises a metallic frame around which a plurality of arms are mounted, each arm having one extremity designed so as to receive one of the subconductors and another extermity connected to the frame by means of a joint. Each joint includes a ring fitting in a cheek, four shoulders radially and symmetrically mounted on the inner wall of the ring, four pairs of elastomers inside each ring and making a right angle with respect to one anther, the elastomer of each pair being spaced from one another by one of the shoulders, and a central pivot inserted between the pairs of elastomers and inside the ring. The ring and the cheek constituting each joint are maintained together by means of tenon-mortise joints and a set of bolts and nuts. On the other hand, the ring of the joint may be an integral part of either the frame or the arm, the associated cheek being then integral to the arm or the frame, respectively. Furthermore, there is provided an arrangement of a spacer-damper made of biarticulated arms including two orthogonally mounted parts.

30 Claims, 10 Drawing Figures

SPACER-DAMPER

The present invention relates to a spacer-damper useful in spacing bundled subconductors of an electric transmission line as well as in damping vibrations caused by wind or due to under-spans of subconductors and which are induced therein, and more particularly concerns an improved structure of spacersdampers.

A large number of spacer-damper types are already known. For example, one type is described in U.S. Pat. No. 3,748,370 issued on July 24, 1973 to Dalia. That patent concerns a spacer-damper provided with several articulated arms mounted for movement on a rigid frame by means of monolithic rubber members or elastomers cooperating with a pivot so as to allow relative movement in rotation between the arm and the frame. In that arrangement, the pivot and the elastomers are maintained into position by a screwed cover. However, the elastomers, which extend throughout the joint, show, on the long run, fatigue signs due to the shearing and friction forces they encounter and have a tendency to come out of their respective seat, these inconveniences resulting in a decrease in their static rigidity and therefore a decrease in their capacity of suitably damping the vibrations or oscillations induced in the subconductors. In addition, those vibrations in the joints of the spacer may produce looseness of the fixing covers, which results in the collapse of the joint and even the breaking of the transmission line. Those inconveniences cause increased working expenses of the transmission lines, considering the replacement and repair cost of the spacers to which may be added the service breaking costs to the subscribers.

The present invention is primarily directed to a spacer-damper free of the above-mentioned drawbacks and of an improved structure while offering a greater reliability of operation and an advantageous manufacturing cost.

More specifically, the present invention resides in a spacer-damper of the type able to space subconductors of a bundle in a power-transmission line and to damp vibrations generated in those subconductors, and which comprises a metallic frame; a plurality of metallic arms, each arm having one extremity constituted so as to receive one of the subconductors and another extremity connected to the frame by means of a joint, each joint including a ring fitting in a cheek; four shoulder means disposed radially and symmetrically on the inner wall of the ring; four pairs of elastomers mounted in each ring and set at right angles one with respect to another, the elastomers of each pair being spaced from one another by one of the shoulder means; a central pivot being inserted between the pairs of elastomers, inside each ring; and means for fixing each pivot to each cheek.

Preferred embodiments of the present invention will be hereinafter described with reference to the accompanying drawings, wherein FIG. 1 is a plan view of a spacer-damper according to the present invention, wherein each arm is provided with a single joint;

Figure 1:
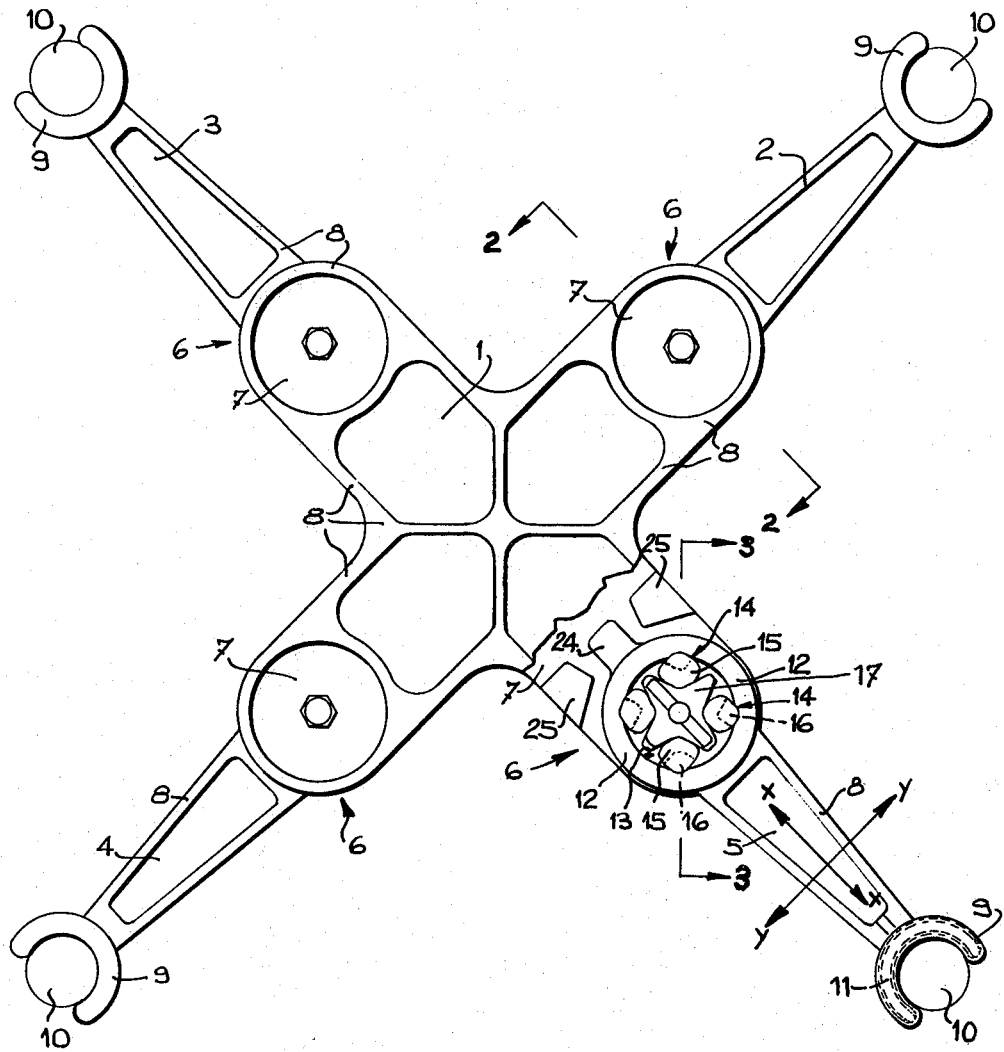
Figure 2:
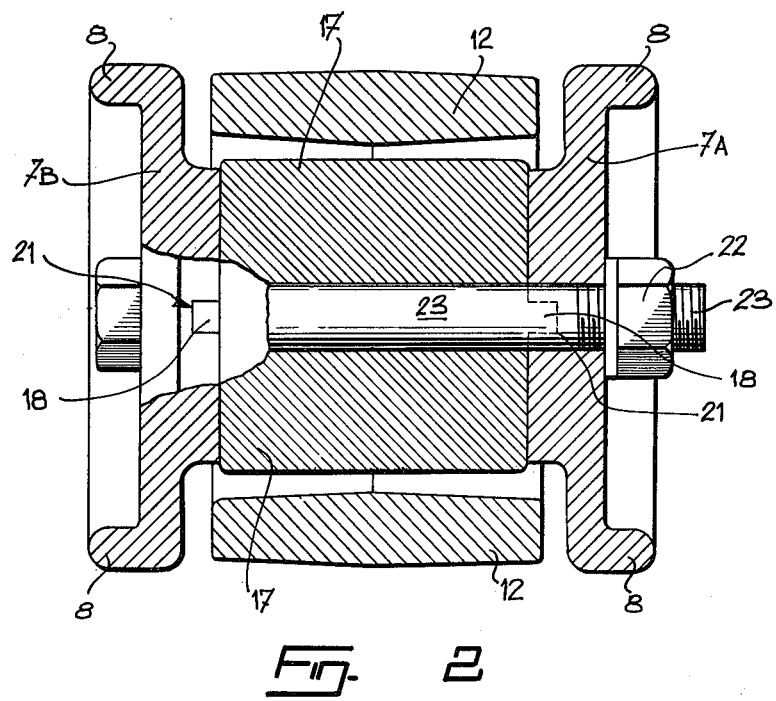
FIG. 2 is a cross-sectional view of a joint of the spacer-damper, taken along line 2—2 of FIG. 1.
Figure 3:
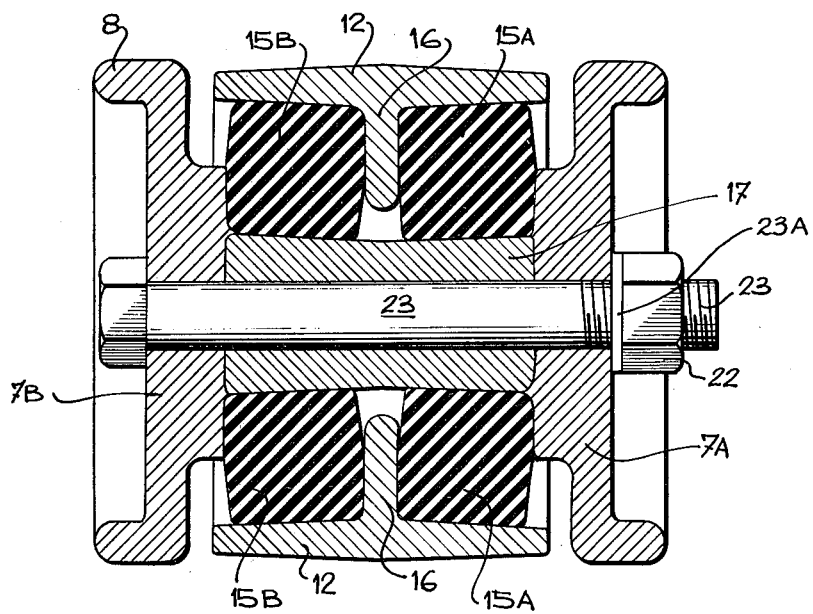
FIG. 3 is another cross-sectional view of the joint, taken along line 3—3 of FIG. 1.
Figure 4:
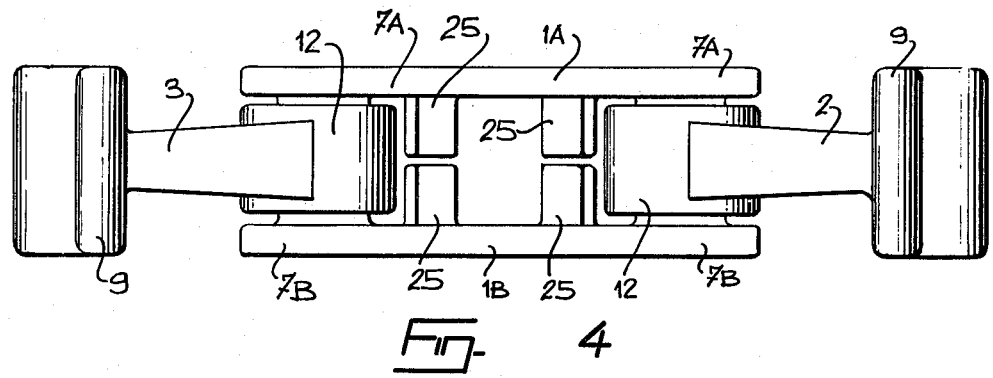
Figure 9:
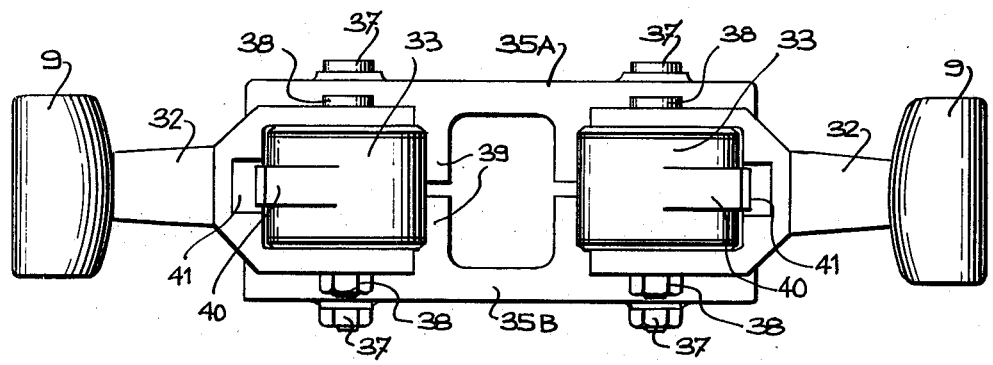
Figure 5:
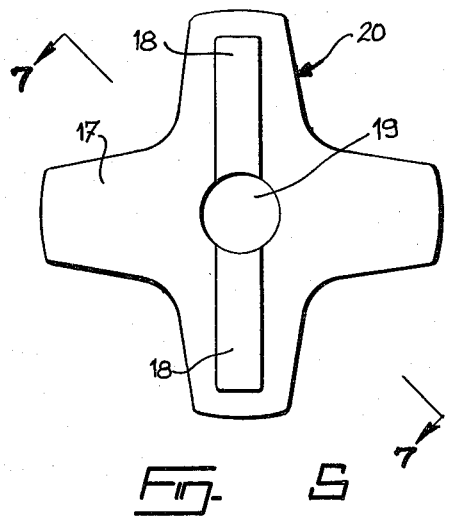
Figure 6:
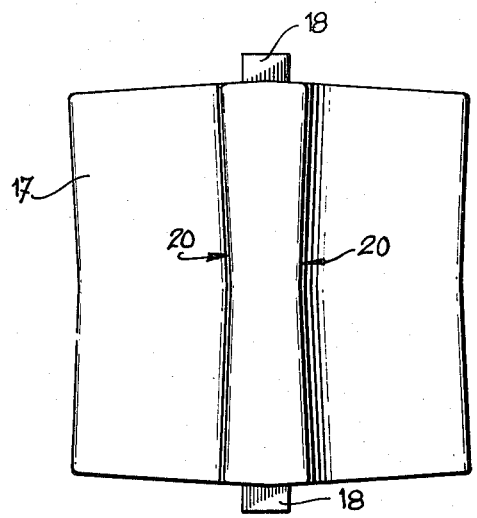
Figure 7:
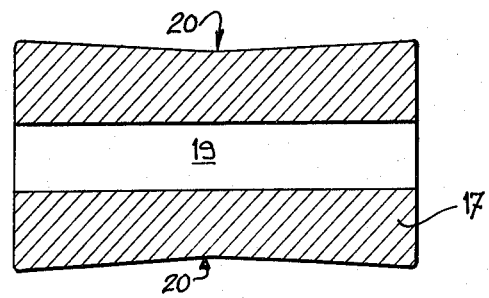
Figure 8:
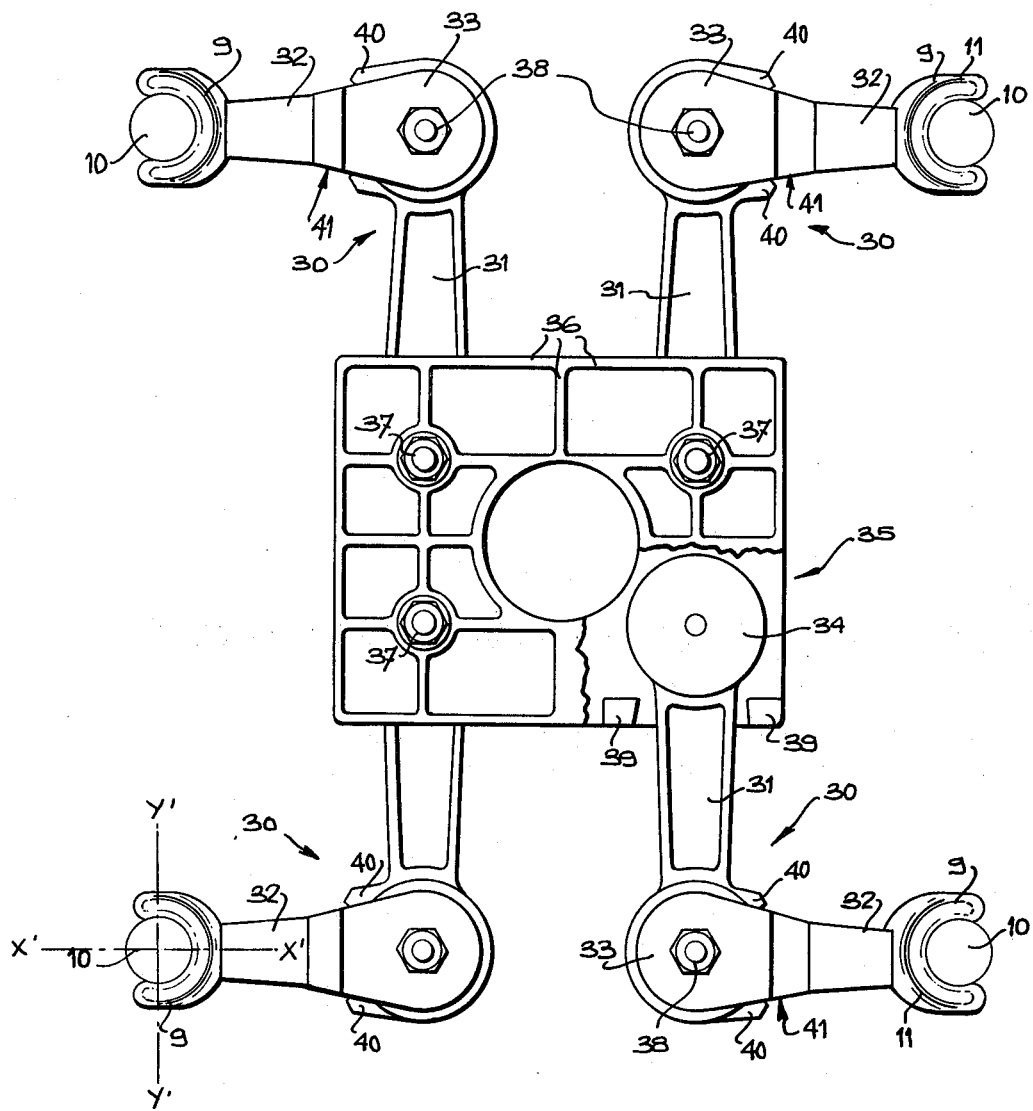

FIG. 4, appearing on the same sheet as FIG. 9, is a side view of the spacer-damper of FIG. 1;

FIG. 5 is a cross-sectional view of the pivot used in the joint of the spacer-damper of FIG. 1;

FIG. 6 is a side view of the pivot of FIG. 5;

FIG. 7 is a cross-sectional view of the pivot of FIG. 5, taken along line 7-7;

FIG. 8 illustrates another embodiment of the spacer-damper according to the present invention and wherein each arm comprises two joints;

FIG. 9 is a side view of the spacer-damper of FIG. 8; and

Figure 10:
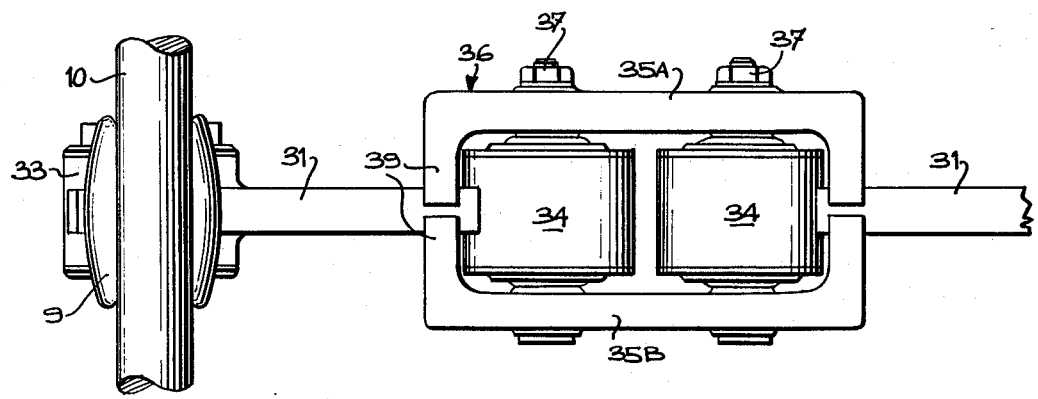

FIG. 10 is another partial side view of the spacer-damper of FIG. 8.

FIGS. 1 to 4 illustrate a first embodiment of the spacer-damper according to the present invention and wherein the same numerical references designate identical elements. The spacer-damper comprises a metallic core or frame 1, made of cast aluminum, and four articulated arms 2, 3, 4 and 5, also metallic, mounted symmetrically around the core 1, arm 5 being shown following a longitudinal cross section to visualize better the elements forming the joint 6. Indeed, the core 1 is constituted of two identical parts 1A and 1B (see FIG. 4) coupled back-to-back so as to form the cheeks 7 made up from the portions 7A and 7B of parts 1A and 1B of core 1. On the other hand, upright ribs 8 are provided for reinforcing the arm and core structures, while allowing the use of a minimum quantity of metal.

Each arm comprises at one extremity a cable holder 9 of a semi-circular, cylindrical shape for receiving a subconductor 10 in a direction parallel to the rotational axis of joint 6. The inner surface of the cable holder 9 is covered with a rubberlike cushion 11 to prevent all relative movements between the subconductor 10 and the cable holder 9. The other extremity of each arm includes a ring 12 which is an integral part thereof and the inner wall of which comprises cavities 14 of a parabolic shape which serve as seats to the pairs of rubber members or elasmers 15, the latter being set at right angles with respect to one another. Furthermore, referring more particularly to FIG. 3, the elastomers 15A and 15B of each set 15 lean on a shoulder 16 integrated to the inner wall of the ring 12. The shoulders jut out at about mid-height of the ring 12 and present a dimensional area lower than the cross-sectional area of any one of the elastomers following a ratio of approximately 3:2, thereby allowing a proper deflection of the elastomers, when the arm is driven in rotation, without any interference from the shoulders 16.

The pairs of elastomers 15 lead against the outer wall of a pivot 17, in cast aluminum, which is coaxially mounted with a ring 12 and has a cross-shaped configuration with the crosspieces of equal length. That pivot 17 further presents a parabolic shape between two adjacent cross-pieces and between which is housed a pair of elastomers 15. In addition the outer wall of pivot 17 is so-shaped as to maintain the elastomers in their respective position and so as to prevent the latter from rolling out of their housing when the spacer-damper is on duty.

Referring more particularly to FIGS. 5, 6 and 7, wherein FIG. 5 is a plan view of pivot 17, FIG. 6 is a side view of that pivot and FIG. 7 a cross-sectional view taken along line 7—7 of FIG. 5, there is to be noted that the outer wall 20 which is in contact with the elastomers 15, is slightly made parabolic in the axial direction of the pivot and makes with the vertical direction an angle of about 3° to 4°, thereby further ascertaining the holding of the elastomers 15 inside ring 12 and their housing. Such a shape of pivot 17 greatly lowers the tendency of the elastomers to move towards the inner surfaces of cheeks 7 when in heavy-duty, thereby substantially reducing the friction between the elastomers 15 and the surfaces of cheeks 7 while increasing their resistance to fatigue and diminishing the wear thereof.

In the illustrated arrangement of joint 6, the pivot 17 is maintained in a fixed position relative to the frame 8 and between the walls 7A and 7B of cheek 7. This is achieved by means of the tenons 18 each of which projects from the upper and lower surfaces of the pivot. The tenons 18 are integral parts of the pivot 17 and are oriented following the longitudinal axis of any arm of the spacer. When assembled, those tenons 18 respectively and snugly fit into the mortises 21 provided in each plate 7A and 7B of cheek 7. On the other hand, the pivot 17 has an axial, central channel 19 of a smooth surface through which extends a bolt 23 (see FIG. 2) provided with a threaded end for a nut 22. That rather simple fixing method ensures a high stability and strength of pivot 17 inside the ring 12 and between the plates 7A and 7B of cheek 7.

When assembling the joint 6, it is noted that the pivot 17 is firstly set into place at the center of the ring 12 and that the elastomers 15 which have been precompressed, are then inserted between the cavities 14 of the ring and the hollows 20 of the pivot 17 so as to be in registry. The ring 12 with its elements are thereafter introduced between the plates 7A and 7B of cheeks 7 so as to form tenon-mortise joints between the pivot 17 and the plates. Finally, the bolt 23 is inserted into the channel 19 and through the apertures provided in registry with the channel in plates 7A and 7B, nuts 22 being then firmly screwed onto bolts 23 together with the blocking rings 23A. It is to be noted that the bolt-nut units also serve to maintain together the upper and lower parts 1A and 1B of frame 1, this greatly simplifying the assembly of the various components of the spacer-damper.

Moreover, in order to limit the rotational displacement of arm 5, for instance, in the direction of the Y-Y axis, e.g. around the rotation axis of ring 12, a metallic lug 24 is provided at the rear part of ring 12 and along the longitudinal axis of arm 5. When vibrations having amplitudes such as to cause a maximum displacement of the spacer arm are present in the subconductors 10, that lug 24 strikes the metallic stops 25 located between the plates 7A and 7B of cheeks 7 and on both sides of lug 24. That lug-stop unit actually allows to limit the rotation displacement of the arm according to the Y-Y axis to an angle of about 12° to 13° in each direction from the rest position of the arm.

Moreover, a clearance of about 2 mm is provided between the extremities of each cross-piece of the pivot 17 and the inner wall of ring 12 to allow a linear displacement of the arm following its longitudinal axis, along the X—X directions. In addition, the above-described configuration of the moving ring and the fixed pivot permits a bidirectional angular displacement of the arm 5 around the X—X axis as well as a bidirectional angular displacement around the Y—Y axis, these two angular displacements being of approximately ±7° in the advocated arrangement.

The operation of the spacer-damper described above is relatively simple and will be described hereinafter. Firstly, it is to be noted that when the articulated arms are in their rest position, e.g. as illustrated, the clearance between the extremities of the cross-pieces and the inner wall of the ring is at maximum. Indeed, the static rigidity of the elastomers 15 ascertains the holding of that rest position of the arms when no vibration or low amplitude vibrations, but insufficient to overcome the restoring forces of the elastomers, are generated in the subconductors 10. When the subconductors 10 are submitted to vibrations in the Y—Y plane, e.g. in a plane transverse to the longitudinal axis of the arms, the ring 12 is displaced in rotation with respect to the fixed pivot 17 and the elastomers 15 of each pair then undergo a deflection resulting from their elastic deformation, but without moving away from their housing between the cavities 14 of crown 12 in the parabolic hollow of pivot 17 in view of the friction coefficient existing between the contact points of the elastomers 15 and the shoulders 16. It is noted that, in this case, the space between the extremities of the cross-pieces of pivot 17 and the inner wall 13 of the ring 12 remains substantially constant due to the fact that each pair of elastomers of the joint is similarly subjected to the external compression force so that all the elastomers encountered a proportional dynamic deflection, this substantially reducing the shearing action on elastomers 15. At the beginning, when the rotation of arm 5 is initiated, the elastomers 15 present a low resistance to deformation, their restoring force being then rather low. However, as deformation increases, the restoring force of the elastomers also rapidly increases so as to damp efficiently the amplitude of the vibration in the subconductor by absorbing its energy through the joints 6 and the frame 1 of the spacer-damper. It is noted that even where high vibrations occur, there exist little friction between the elastomers 15 and their bearing points, the vibration energy being primarily absorbed by the elastomers themselves, this contributing to enhance substantially the life of the elastomers 15.

Moreover, because of the rigidity and the damping action of joint 6, wherein the elastomers 15 are precompressed, the conjugated restoring forces of the elastomers towards a fixed rest position avoid the possibility of having any resonance or oscillation state of the spacer arms to be sustained and thus ensure a rapid and efficient damping of the vibrations generated in the bundled subconductors of a transmission line.

Obviously, other shapes than the cross shape of the pivot of the joint 6 may be adopted in the advocated arrangement provided the other configurations comply with the above-described operating characteristics and retain the degrees of freedom of each arm with respect to the corresponding cheeks in order to damp vibrations omni-directionally generated in the subconductors.

Moreover, the ring 12 of the joint 6 (FIG. 1) may be made integral to the frame 1, which may have a monolithic structure, whereas the pivot 17, then mounted inside the ring of the frame, is fixed in the above-described manner to the cheek which, in this case, is formed at the corresponding extremity of the arm of the spacer. Such an arrangement of a fixed ring and a moving pivot obviously possesses operation characteristics which are wholly identical to those mentioned above in connection with the arrangement of FIG. 1 since the elements (pairs of elastomers, central pivot, shoulders) constituting the joint itself remain essentially the same.

FIGS. 8, 9 and 10 illustrate another embodiment of the spacer-damper provided with articulated arms, according to the present invention. FIG. 8 is a plan view of the embodiment whereas FIGS. 9 and 10 are respectively back and side views. This spacer-damper comprises a metallic core or frame 35 of a general rectangular configuration, with reinforcing upright ribs 36 and constituted of two identical parts 35A and 35B mounted back-to-back. The frame 35 supports four bi-articulated arms 30 for damping transverse vibrations generated in the subconductors 10 and propagating along the two orthogonal axes X'—X' and Y'—Y', when each subconductor 10 is fixed to the cable holder 9 provided with the anti-skidding cushion 11. Each articulated arm 30 is constituted of two parts 31 and 32 being substantially of equal length and mounted at right angles with respect to one another. The intermediary part 31 of arm 30 is moved in rotation with respect to frame 35 by means of the joint 34 whereas the end part 32 of arm 30 is capable of rotation with respect to the intermediary part 31 by means of the joint 33. Those joints 33 and 34 include each the same elements as those described above in connection with the arrangement of FIG. 1 and which are four pairs of elastomers symmetrically mounted inside a ring provided with shoulders and a fixed central pivot so designed to form with cheeks tenon-mortise joints. That spacer-damper however presents inherent characteristics when compared with the one previously described, which characteristics result from a different structural configuration of parts 31 and 32 of each bi-articulated arm 30. Indeed, the intermediary part 31 bears, at each of its extremities, the rings of joints 33 and 34 whereas the corresponding cheek of each joint is formed in frame 35 for joint 34 and in the end part 32 for joint 33.

On the other hand, the rotation displacement angle of part 31 is limited by the stops 39 in frame 35 in direction X'—X', and by stops 40 provided on the ring of joint 33 and the lug 41 as to direction Y'—Y'.

The set of bolts-nuts 37 serve to maintain firmly into position parts 35A and 35B of frame 35 as well as the elements forming joints 34. Similary, the set of bolts-nuts 38 fixedly interconnects the cheeks of parts 32 of arms 30 to the pivots of joints 33.

The embodiment of FIG. 8 allows a highly effective damping of the vibrations generated in the subconductors and following two planes which are orthogonal one another and transverse to the longitudinal axis of the subconductors. The operating characteristics of each joint are indeed identical to those mentioned above in relation with the spacer-damper of FIG. 1.

On the other hand, it is obvious that the ring of joint 34 may as well be made an integral part of frame 35 whereas the associated cheek is formed in the intermediary arm 31. Similarly, the ring of joint 33 may be integrated to the end arm 32 and, in this case, the corresponding cheek is formed in the intermediary arm 31. Thus, the two extremities of the intermediary arm 31 may be formed either of cheeks or of rings, or even include a ring at one end and a cheek at the other end, according to the desired arrangement. It is important to note that, regardless of the arrangement selected, the intrinsic configuration, the structure and the operating characteristics of joints 33 and 34, and therefore of the bi-articulated arms 30, remain essentially the same as those described above.

It is understood that the present invention is not limited to the embodiments described above, given as examples only, and that modifications and structural changes may be drawn without hampering the gist of the present invention.

I claim:

1. A spacer-damper of the type for separating bundled subconductors of a power transmission line and for damping vibrations generated in those subconductors, comprising a metallic frame; a plurality of metallic arms mounted around said frame, each arm having one extremity shaped so as to receive one of said subconductors and another extremity which is connected to said frame by means of a joint; each joint comprising a cheek wherein a ring is fitted, four shoulder means disposed radially and symmetrically on the inner wall of said ring, four pairs of elastomers mounted inside said ring and making a right angle with respect to one another, the elastomers of each pair being spaced from one another by one of said shoulder means, a central pivot set between the pairs of elastomers and inside the ring of said joint, and means for fixing said pivot to said cheek of each joint.

2. A spacer-damper as claimed in claim 1, characterized in that said cheek of each arm is an integral part of said frame, said ring being then part of said arm.

3. A spacer-damper as claimed in claim 1, characterized in that said ring of each arm is an integral part of said frame, said cheek being then part of said arm.

4. A spacer-damper as claimed in claim 1, characterized in that each arm comprises an intermediary part and an end part, the latter parts being orthogonally mounted with respect to one another, and in that a first joint is formed between said intermediary part and said frame and a second joint formed between said end part and said intermediary part, each of said first and second joints being identical to said joint.

5. A spacer-damper as claimed in claim 4, wherein the ring of said first joint is integral to said frame whereas the corresponding cheek is an integral part of said intermediary part of the arm.

6. A spacer-damper as claimed in claim 4, wherein the cheek of said first joint is integral to said frame whereas the corresponding ring is part of said intermediary part of the arm.

7. A spacer-damper as claimed in claim 4, 5 or 6, wherein the ring of said second joint is integral to said intermediary part of the arm whereas the corresponding cheek is part of said end part of the arm.

8. A spacer-damper as claimed in claim 4, 5 or 6, wherein the cheek of said second joint is integral to said intermediary part of the arm whereas the corresponding ring is an integral part of said end part of said arm.

9. A spacer-damper of the type for separating bundled subconductors of a power transmission line and for damping vibrations generated in those subconductors, comprising a metallic frame provided with a plurality of cheeks disposed around the frame; a plurality of metallic arms, each arm having one extremity so shaped as to receive one of the subconductors and another extremity including a ring and fitting in one of said cheeks; four shoulder means radially and symmetrically mounted on the inner wall of the ring of each arm; four pairs of elastomers provided in each ring and making a ring angle with respect to one another, the elastomers of each pair being spaced from one another by one of said shoulder means; a central pivot being inserted between the pairs of elastomers, inside said ring of each arm so as to form a joint; and means for fixing each pivot of one arm to one cheek of the metallic frame.

10. A spacer-damper as claimed in claim 9, characterized in that said metallic frame comprises two identical parts, mounted back-to-back, and in that each part of the frame includes reinforcing upright ribs.

11. A spacer-damper as claimed in claim 9, characterized in that said cheeks are integral parts of said frame and symmetrically disposed around the latter.

12. A spacer-damper as claimed in claim 9, characterized in that said one extremity of each arm comprises a cable holder having a cylindrical and semi-circular shape and includes means for fixing one subconductor to said cable holder.

13. A spacer-damper as claimed in claim 9, characterized in that cavities are provided in the inner wall of said ring and throughout each shoulder to house each pair of elastomers.

14. A spacer-damper as claimed in claim 13, characterized in that said shoulder means are located at mid-height in said cavities of said ring.

15. A spacer-damper as claimed in claim 1 or 9, characterized in that the elastomers of the four pairs are precompressed and have a common static rigidity which is such as to maintain the arm in a predetermined rest position when the subconductor is submitted to no vibrations.

16. A spacer-damper as claimed in claim 1 or 9, characterized in that said central pivot is crossed-shaped with crosspieces of equal length, and in that the elastomers of each pair lean against the junction point of two adjacent cross-pieces.

17. A spacer-damper as claimed in claim 1 or 9, wherein said means for fixing each pivot to the cheek comprise tenon-mortise joints.

18. A spacer-damper as claimed in claim 1 or 9, wherein said means for fixing each pivot comprise tenon-mortise joints and a set of bolts and nuts, a channel being provided in the pivot and in registry with apertures in the cheek for the fixing bolt of the set.

19. A spacer-damper as claimed in claim 9, wherein means are provided to limit a displacement in rotation of each arm around the axis of said joint.

20. A spacer-damper as claimed in claim 19, wherein the rotation limiting means comprise a lug set on the outer wall of said ring and along the longitudinal axis of said arm, and stops in said cheek and located at either sides of said lug.

21. A spacer-damper of the type for separating bundled subconductors of a power transmission line and for damping vibrations generated in those subconductors, comprising a metallic frame; a plurality of metallic arms linked to said frame, each arm being made up of an intermediary part and an end part; a first joint formed between said intermediary part and said frame and a second joint formed between said end part and said intermediary part, these parts of the arm being orthogonally mounted with respect to one another; each joint comprising a cheek wherein a ring is fitted, four shoulder means radially and symmetrically mounted on the inner wall of said ring, four pairs of elastomers set inside said ring and making a right angle with respect to one another, the elastomers of each pair being spaced from one another by one of said shoulder means, a central pivot between the pairs of elastomers and inside the ring of the joint, and means for fixing said pivot to said cheek; said first joint having its cheek formed in said frame and its ring connected to one of the extremities of said intermediary parts whereas the cheek of said second joint is formed at one extremity of the end part of the arm and the corresponding ring of the second joint is connected to the outer extremity of the intermediary section of the arm; and means being provided at the outer extremity of said end part of the arm to fix one of the subconductors.

22. A spacer-damper as claimed in claim 21, characterized in that said metallic frame is made up of two identical parts, mounted back-to-back, and comprises reinforcing upright ribs.

23. A spacer-damper as claimed in claim 21, characterized in that said means for fixing one subconductor comprise a cable holder having a cylindrical and semi-circular shape and means to tie up the subconductor to said cable holder.

24. A spacer-damper as claimed in claim 21, characterized in that cavities are provided in the inner wall of the ring of each joint and in that each pair of elastomers is lodged within one of said cavities and between one of said shoulder means.

25. A spacer-damper as claimed in claim 24, characterized in that said shoulder means are located at mid-height within said cavities of said ring.

26. A spacer-damper as claimed in claim 21, characterized in that the elastomers of said four pairs are precompressed and present a common static rigidity such as to maintain the arm in a predetermined rest position when the subconductor is not submitted to vibrations.

27. A spacer-damper as claimed in claim 21, characterized in that said pivot is cross-shaped with crosspieces of equal length and that the elastomers of each pair lean against the junction point of two adjacent cross-pieces.

28. A spacer-damper as claimed in claim 21, wherein said means for fixing each pivot to one cheek comprise tenon-mortise joints.

29. A spacer-damper as claimed in claim 28, wherein said fixing means further comprise a set of bolts and nuts, and wherein a channel is provided throughout the pivot and in registry with apertures in said cheek for insertion of the fixing bolt of the set.

30. A spacer-damper as claimed in claim 21, wherein means are provided to limit displacement of each arm around the rotation axis of each joint.

* * * * *